(12) United States Patent
Li

(10) Patent No.: US 7,634,262 B1
(45) Date of Patent: Dec. 15, 2009

(54) VIRUS PATTERN UPDATE FOR MOBILE DEVICE

(75) Inventor: Zhonglei Li, Nanjing (CN)

(73) Assignee: Trend Micro, Inc. (JP)

( * ) Notice: Subject to any disclaimer, the term of this patent is extended or adjusted under 35 U.S.C. 154(b) by 409 days.

(21) Appl. No.: 11/369,704

(22) Filed: Mar. 7, 2006

(51) Int. Cl.
*H04L 12/58* (2006.01)
*H04M 1/725* (2006.01)
*H04Q 7/22* (2006.01)

(52) U.S. Cl. ............... 455/419; 370/235; 370/252; 370/311; 370/352; 370/389; 370/392; 370/394; 370/236; 370/315; 370/237

(58) Field of Classification Search ............... 709/225, 709/224, 433.12, 206; 370/235, 252, 311, 370/352, 389, 392, 394, 236, 315; 455/575.4, 455/418, 424, 456.24, 406, 408; 713/188, 713/201, 200, 182; 710/20.4; 726/24, 22, 726/23
See application file for complete search history.

(56) References Cited

U.S. PATENT DOCUMENTS

| | | | | |
|---|---|---|---|---|
| 6,842,861 | B1 * | 1/2005 | Cox et al. ............... | 713/188 |
| 6,976,011 | B1 * | 12/2005 | Capitant et al. ............ | 705/67 |
| 2003/0074581 | A1 * | 4/2003 | Hursey et al. ............ | 713/201 |
| 2004/0025042 | A1 * | 2/2004 | Kouznetsov et al. ........ | 713/200 |
| 2004/0083384 | A1 * | 4/2004 | Hypponen ................ | 713/200 |
| 2004/0209608 | A1 * | 10/2004 | Kouznetsov et al. ........ | 455/418 |
| 2004/0209609 | A1 * | 10/2004 | Kouznetsov et al. ........ | 455/418 |
| 2004/0210645 | A1 * | 10/2004 | Kouznetsov et al. ........ | 709/220 |
| 2004/0210891 | A1 * | 10/2004 | Kouznetsov et al. ........ | 717/168 |
| 2005/0031095 | A1 * | 2/2005 | Pietrowicz .............. | 379/88.18 |
| 2005/0177868 | A1 * | 8/2005 | Kwan .................... | 726/11 |
| 2006/0005033 | A1 * | 1/2006 | Wood .................... | 713/182 |
| 2006/0031937 | A1 * | 2/2006 | Steinberg ................ | 726/24 |
| 2006/0161985 | A1 * | 7/2006 | Zhao .................... | 726/24 |
| 2006/0191011 | A1 * | 8/2006 | Korkishko et al. .......... | 726/24 |
| 2006/0203969 | A1 * | 9/2006 | Jorasch et al. ............ | 379/32.01 |
| 2007/0003063 | A1 * | 1/2007 | Smith et al. .............. | 380/278 |
| 2007/0117593 | A1 * | 5/2007 | Izdepski ................ | 455/565 |
| 2007/0240220 | A1 * | 10/2007 | Tuvell et al. .............. | 726/24 |
| 2007/0240222 | A1 * | 10/2007 | Tuvell et al. .............. | 726/24 |

OTHER PUBLICATIONS

A White Paper by Trend Micro, Dec. 2005. "Security for Mobile Devices: Protecting and Preserving Productivity".

* cited by examiner

*Primary Examiner*—Rafael Pérez-Gutiérrez
*Assistant Examiner*—Joseph Arevalo
(74) *Attorney, Agent, or Firm*—Beyer Law Group LLP

(57) ABSTRACT

An updated virus pattern file is developed at an update server. A mobile management center (MMC) has a list of mobile telephone numbers and receives the new virus pattern from the update server. A Multimedia Message Service Center receives the new virus pattern and the list of mobile telephone numbers from the MMC and sends an MMS message to each of the wireless devices, including the new virus pattern as an attachment. Each wireless device replaces the old virus pattern with the new virus pattern. A unique identifier (a cryptographic signature or magic number) is added to each MMS message to enable the wireless device to recognize a new virus pattern. The pattern version and the pattern itself are merged into a single file. The file is also encrypted at the MMC and decrypted at the wireless device.

19 Claims, 7 Drawing Sheets

Mobile Telephone Block Diagram

VIRUS PATTERN UPDATE FOR MOBILE DEVICE

FIELD OF THE INVENTION

The present invention relates generally to computer virus detection on a mobile telephone. More specifically, the present invention relates to a technique for updating a pattern file on a mobile telephone.

BACKGROUND OF THE INVENTION

The threat of computer viruses, worms and other types of malicious software are now commonplace in computer systems. And as the number of data-centric mobile devices grows (e.g., mobile telephones), these devices also will become attractive targets for computer viruses, SMS spam and other malicious software. Many of these handheld devices run the same operating systems thus making it easier for unscrupulous parties to distribute malicious software and to disrupt mobile telephone usage. In addition to frustrating consumers, computer viruses and message spam cause individuals and companies to suffer from lost productivity and the high cost of fixing any problems.

Computer viruses and other malware can arrive at a mobile device through a variety of delivery vectors and actions. These actions include: inserting an infected storage card into the device; synchronizing the device with a computer that downloads an infected file; downloading an infected file from the Web to the device; using the wireless application protocol (WAP) that pushes a suspect Web link containing an infected file to the mobile device; using a Bluetooth or infrared transmission that pushes an infected file from one mobile device to another; using a wireless network; etc.

For example, more and more malicious software is now targeting operating systems of mobile telephones. The "SYMBOS_FONTAL.B" computer virus affects mobile devices running the Symbian operating system including a variety of mobile telephones. The virus is downloaded over the Internet or other network and pretends to be a Nokia antivirus application; it tricks the user into installing it on their mobile telephone. Upon installation it displays a benign message and prompts the user to restart the device. Once the device restarts the virus causes the device to constantly restart; the only way a to fix the problem is to restore the factory settings on the telephone, thus erasing any personal information or other data that the user had stored on the telephone.

It is possible to run antivirus software utilizing a virus pattern on a mobile telephone in order to detect a software virus or other malware. But, using a virus pattern to detect known viruses and malware requires not only that the pattern be downloaded to the telephone in the first place, but also that the pattern be updated periodically.

Currently there are two techniques for updating a virus pattern on a mobile telephone. One technique is to receive a virus pattern update over a TCP/IP connection. The mobile telephone user connects to an update server over a wireless connection that supports the TCP/IP protocol. (Or, the user connects the mobile telephone to his or her computer in order to directly download the new virus pattern.) Typically, this update server is the normal antivirus update server used to obtain updates over a wired connection to personal computers. Unfortunately, this technique relies upon the user to connect and perform the update when he or she remembers to do so. Therefore, the update is often not timely. Sometimes the antivirus software provider will send an SMS message to remind the user to perform an update. (In a variation, specially formatted SMS messages display an alert message to the user and provide the option of connecting directly to a particular URL via the mobile telephones WAP browser.) But, because a wireless network typically has low bandwidth, the network may become overloaded if all users attempt to perform an update at the same time from the update server.

The second technique is to use the short message service (SMS) to perform the update. The antivirus software provider uses SMS to make a new pattern available to the mobile telephone user. But, because SMS has a body length limit of 140 bytes, it is not possible to send the entire new pattern to the mobile telephone using SMS. Only the pattern differential between the old pattern and the new pattern can be sent using SMS. Also, the pattern file format must be designed so that it is easy to merge the old pattern with the pattern differential. Further, SMS can be unstable; if an SMS update is lost the mobile telephone may be left without the full pattern and no virus detection capability.

FIG. 1 illustrates a prior art virus pattern update using SMS. A mobile telephone user 20 has a mobile telephone 22 that incorporates antivirus software that uses a virus pattern file to detect computer viruses and other malware. The virus pattern file periodically needs updating. A mobile management center 30 makes a determination that it is time to update the pattern on the user's mobile telephone and sends a request 40 for the latest pattern to an update source 44. The update source returns the new pattern 46 to the mobile management center that then creates a differential between the old pattern and the new pattern. This pattern differential is sent via SMS to an SMSC (Short Message Service Center) 64 that then relays an SMS message incorporating the pattern differential to the user's telephone 22. The antivirus software on the telephone then applies the pattern differential to the old pattern in order to obtain the new virus pattern. As discussed above, this technique has drawbacks.

Accordingly, a technique is desired that would allow users of mobile telephones and other wireless handheld devices to simply and easily obtain virus pattern updates for their mobile telephones in a timely manner.

SUMMARY OF THE INVENTION

To achieve the foregoing, and in accordance with the purpose of the present invention, a technique is disclosed that allows users of wireless devices to obtain new pattern files or updates to pattern files easily and quickly.

In a first embodiment of the invention, a virus pattern is updated on a handheld, wireless device by first receiving a new virus pattern at a mobile management center. The new virus pattern and a telephone number of the wireless device are sent to a Multimedia Message Service Center (MMSC). The Center relays the new virus pattern from the MMSC to the user's wireless device; the new virus pattern is integrated with an MMS message. The wireless device receives the MMS message and the new virus pattern and replaces an old virus pattern with the new virus pattern, thus updating antivirus software on the wireless device.

In a second embodiment of the invention, a virus pattern is updated on a handheld, wireless device by first installing an old virus pattern in the wireless device. Next, the wireless device receives an MMS message and extracts a new virus pattern from the MMS message. The old virus pattern is then replaced with the new virus pattern.

In a third embodiment of the invention, a system for updating a virus pattern in handheld, wireless devices includes an update server with a new virus pattern. A mobile management center (MMC) includes a list of mobile telephone numbers, and each of the mobile telephone numbers identifies one of the wireless devices. The MMC receives the new virus pattern from the update server. A Multimedia Message Service Center receives the new virus pattern and the list of mobile telephone numbers and sends the MMS messages to the wireless devices. Each wireless device includes an old virus pattern and receives one of the MMS messages from the MMSC that incorporates the new virus pattern. The wireless device replaces the old virus pattern with the new virus pattern.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is applicable to any of a wide variety of types of data-centric mobile devices such as cellular telephones, mobile telephones, smart telephones and other similar wireless handheld devices that send and receive information over a communications network. Examples include PDAs that incorporate a mobile telephone or other wireless communication, a Blackberry wireless device, and other devices that support MMS programming.

The present invention is applicable to all these types of smartphones and wireless handhelds; the term wireless mobile device will be used below to encompass all of these devices, and in general refers to any mobile telephone or handheld wireless device capable of receiving an MMS message or its equivalent.

Figure 1:
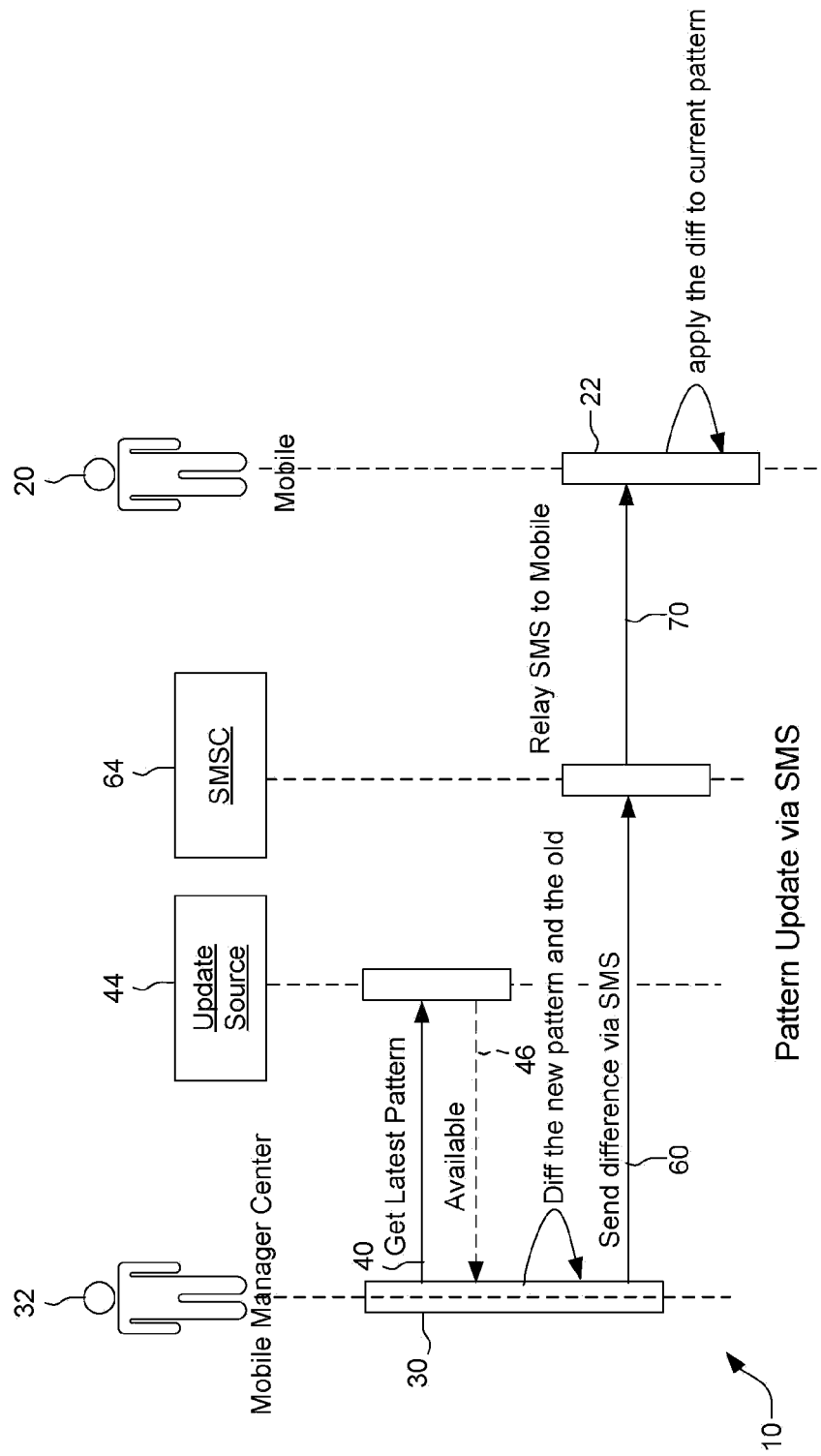
FIG. 1 illustrates a prior art virus pattern update using SMS.
Figure 2:
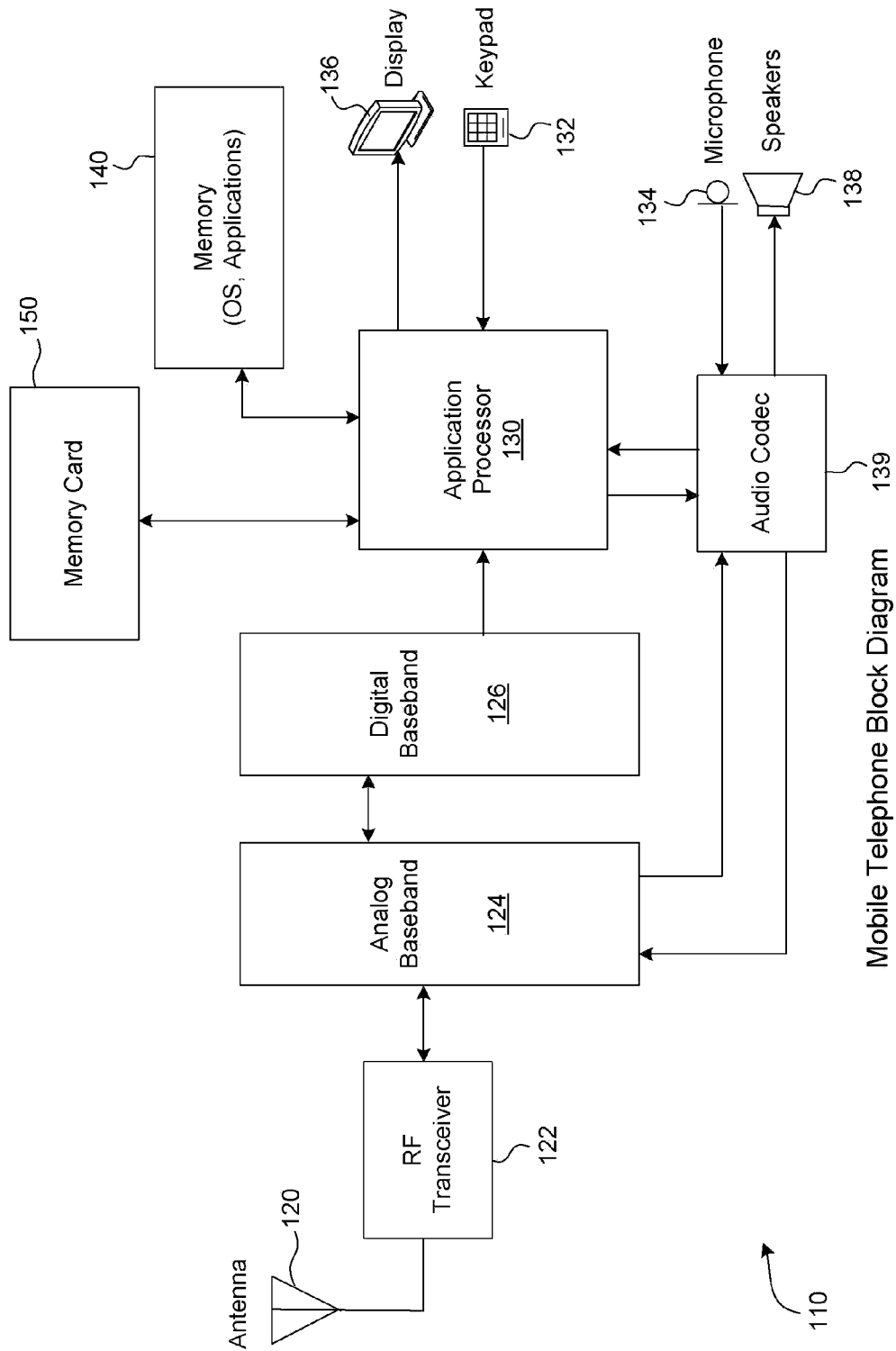
FIG. 2 is a block diagram of a mobile telephone according to one embodiment of the invention.

FIG. 2 is a block diagram of a mobile telephone 110 according to one embodiment of the invention. In this embodiment, telephone 110 is a so-called "smartphone," i.e., a wireless device arranged to run a standard operating system as well as supporting software applications from other vendors. Telephone 110 may be another type of handheld wireless device as described above. Often such a telephone has a dedicated application processor in addition to the processor used for communications functions.

Telephone 110 includes an antenna 120, an RF transceiver 122 and both analog and digital baseband modules 124 and 126 for communication in two modes. An application processor 130 runs the operating system and any applications running on the telephone. A keypad 132 and a microphone 134 provide input to the device, while a display 136 and a speaker 138 provide output. Memory 140 is typically flash memory that stores the operating system for the device and any additional software applications. Memory card 150 is any suitable storage medium used to store data such as text, pictures, audio, video, etc. Card 150 may also be termed a flash memory card or a storage card, and although many current products use flash memory other technologies are being developed and are encompassed by this description. There are a wide variety of types of memory cards on the markets including the SD card (secure digital card), the CF card (compact flash card), the Smart Media card, the memory stick and the multimedia card (MMC). These cards are of varying sizes, shapes and interfaces, and have a range of storage capacities. Each type of card will use a particular interface protocol to communicate with and physically connect to telephone 110, and such interfaces are known to those of skill in the art. Earlier storage media such as the PC card and a smart card may also be considered memory cards. Memory cards are especially suited for portable devices such as mobile telephones, PDAs and other wireless devices as they are removable.

In particular embodiments of the invention the operating system running on telephone 110 (or another wireless device) is the Windows Mobile 2003/2003 Second Edition for smartphones or PocketPC available from Microsoft Corporation, the Symbian Ltd. operating systems 7.0s or 7.0, Palm OS from PalmSource, Mobilinux from MonteVista, or the Blackberry operating system from Research in Motion. As is known in the art, these operating systems are designed for use on mobile devices.

Implementation of memory 140 and memory card 150 is handled differently by the different operating systems. Memory 140 is also referred to as the "C:" drive or native or internal drive, and memory card 150 is also referred to as the "E:" drive or external drive in an operating system where the C: drive and the E: drive are separate drives. In another operating system where only the C: drive is used, the memory card or E: drive exists as a subdirectory of the root drive.

Overview of Pattern Update Via MMS

The present invention utilizes the Multimedia Message Service (MMS) in order to distribute virus pattern files and updates to pattern files. As known in the art, MMS is a relatively new standard that is being defined for use in handheld wireless devices, such as mobile telephones. This service allows for the transmission of various kinds of multimedia content such as graphics, video clips, sound files, text messages, etc., to MMS-capable handsets. MMS is based on the same principle as conventional SMS, but unlike SMS which is limited to 140 bytes, MMS can transmit files having sizes of 100 Kbytes or larger. Most all carriers allow file sizes of at least 40 Kbytes. Using MMS, the pattern file is attached to the MMS message and is delivered to the user's handheld device. As the pattern file in most cases will be relatively small, it is feasible to deliver the entire pattern to the end user in this manner.

The advantages of using this technique are that the pattern file can be updated by the antivirus software provider whenever a new pattern is available and there is no need to wait for the user to initiate an action. Essentially, the entire pattern file is pushed to the user's handset rather than only transferring a differential pattern; there is no need to create a differential pattern nor run the risks of only sending the differential. Further, the pattern file format does not need to be redesigned to allow for updating via a differential pattern. As most mobile device operators support MMS, this is a viable option for most all users.

Figure 3:
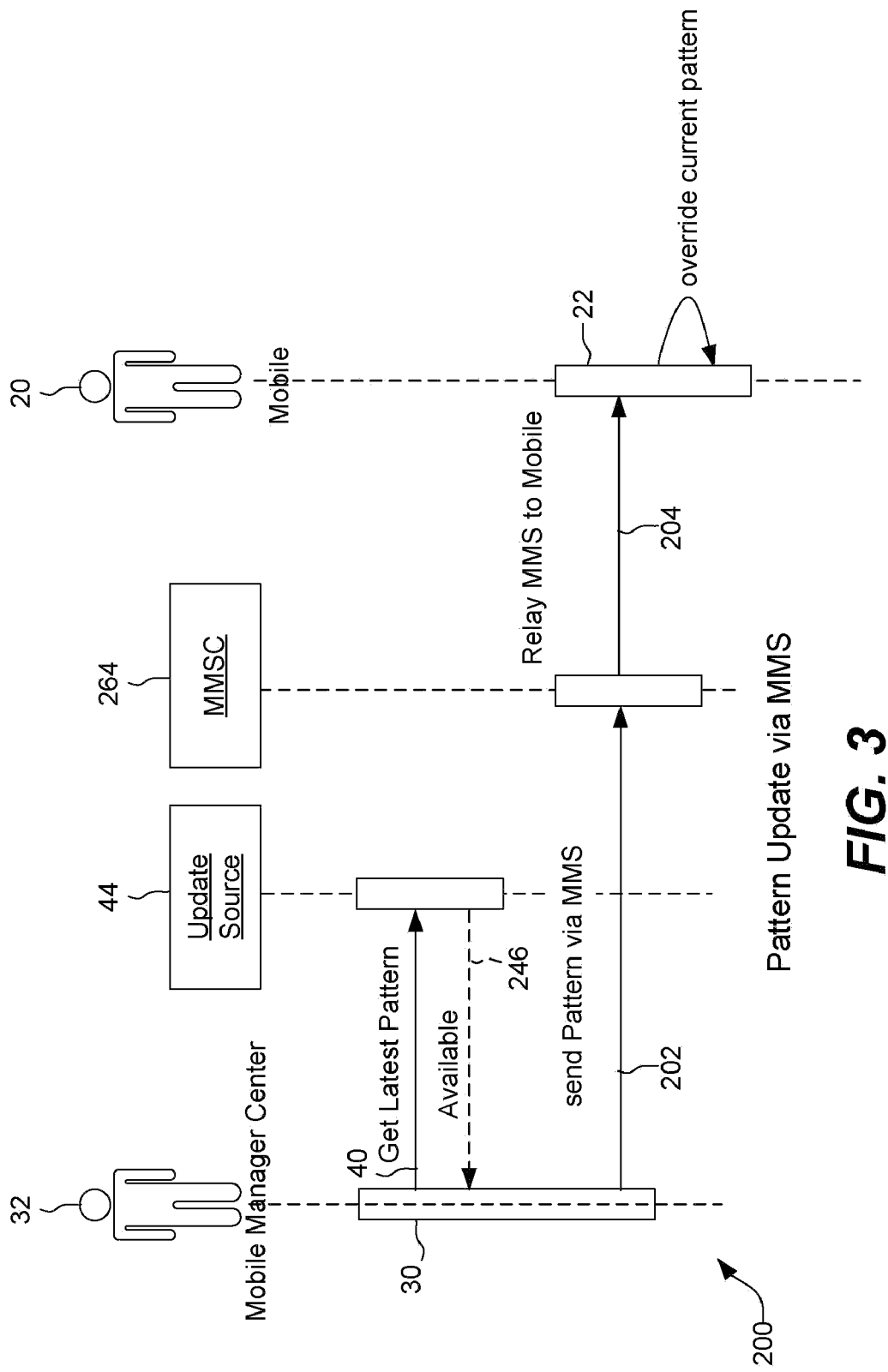
FIG. 3 illustrates an embodiment of the invention in which pattern update occurs via MMS.

FIG. 3 illustrates an embodiment of the invention in which pattern update occurs via MMS. A mobile telephone user 20 has a mobile telephone 22 that incorporates antivirus software that uses a virus pattern file to detect computer viruses and other malware. The virus pattern file periodically needs updating. A mobile management center 30 makes a determination that it is time to update the pattern on the user's mobile telephone and sends a request 40 for the latest pattern to an update source 44. Mobile management center 30 in one embodiment is a server that manages anti-virus update notification for mobile devices that use particular antivirus software, also termed a mobile anti-virus software management center. Update source 44 is a pattern update server implemented by the provider of the antivirus software on the mobile device.

The update source returns the new pattern 246 to the mobile management center over a TCP/IP connection. The mobile management center then sends the new pattern via an MMS message 202 to an MMSC (Multimedia Message Service Center) 264 that then relays an MMS message 204 incorporating the new pattern to the user's telephone 22. The antivirus software on the telephone then replaces the old pattern with the new pattern in order to utilize the new pattern.

Delivery of New Pattern Via MMS

Figure 4:
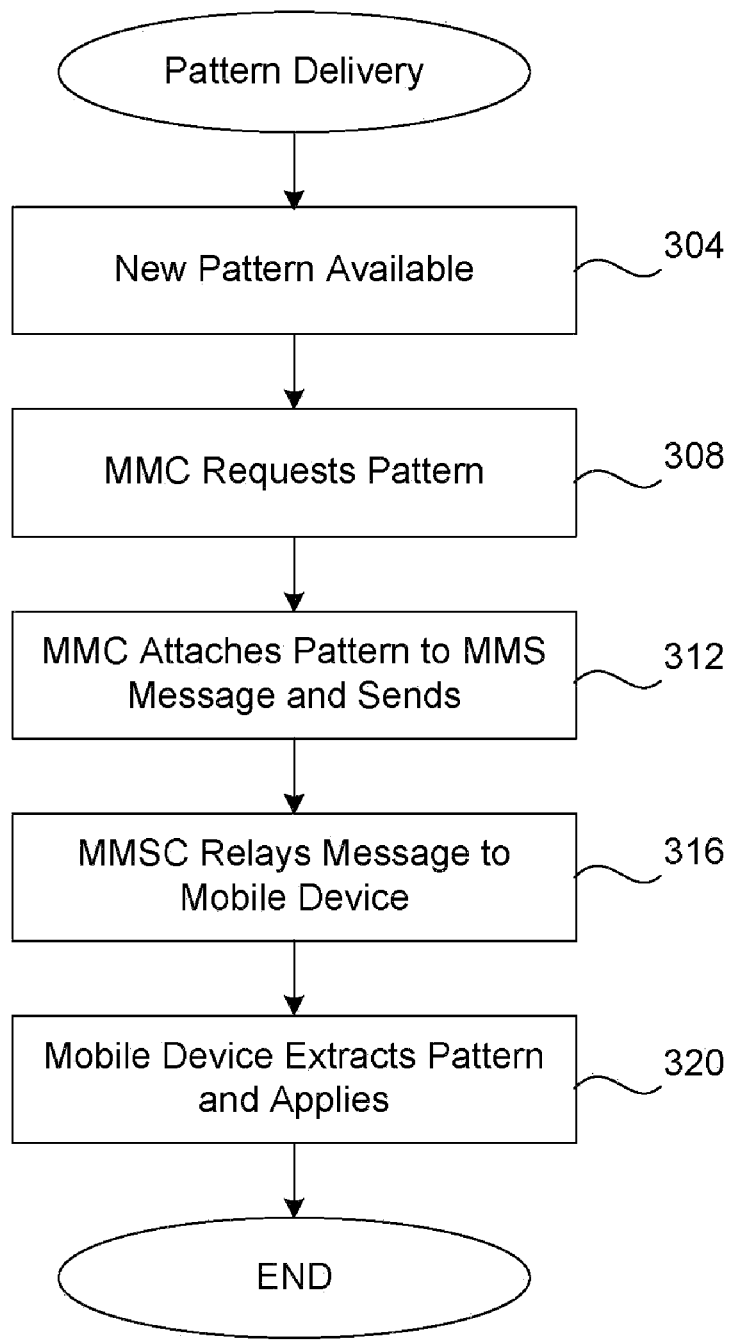
FIG. 4 is a flow diagram describing one embodiment by which a new virus pattern is obtained and delivered to a user's wireless mobile device using MMS.

FIG. 4 is a flow diagram describing one embodiment by which a new virus pattern is obtained and delivered to a user's wireless mobile device using MMS. At 304 a new pattern is made available at update source 44. This may be an update to an existing virus pattern file on a user's device, it may be an entirely new virus pattern file, or it may be a virus pattern file to be installed on a device initially. At 308 the mobile management center 30 requests the pattern and the pattern is transferred to the center.

In one embodiment, the mobile management center checks the pattern update server's latest pattern version via a TCP/IP connection. If the MMC finds a new pattern available, it downloads the new pattern so that the new pattern may be distributed to all mobile devices that it manages. Often, the mobile operator's MMSC provides and sends the MMS application programming interface (API) to the developer, thus enabling a developer to send an MMS message via the MMSC.

At 312 the center attaches the pattern file to an MMS message and sends the message to a user's mobile wireless device using the MMSC 264. At 316 the MMSC relays the received MMS message and the attached pattern file to the user's mobile device using standard technology such as WAP-206 or WAP-209. At 320 the user's mobile device extracts the attached pattern file from the MMS message and overwrites the existing pattern file with the new pattern file. Various techniques for performing this step are described below.

Figure 5:
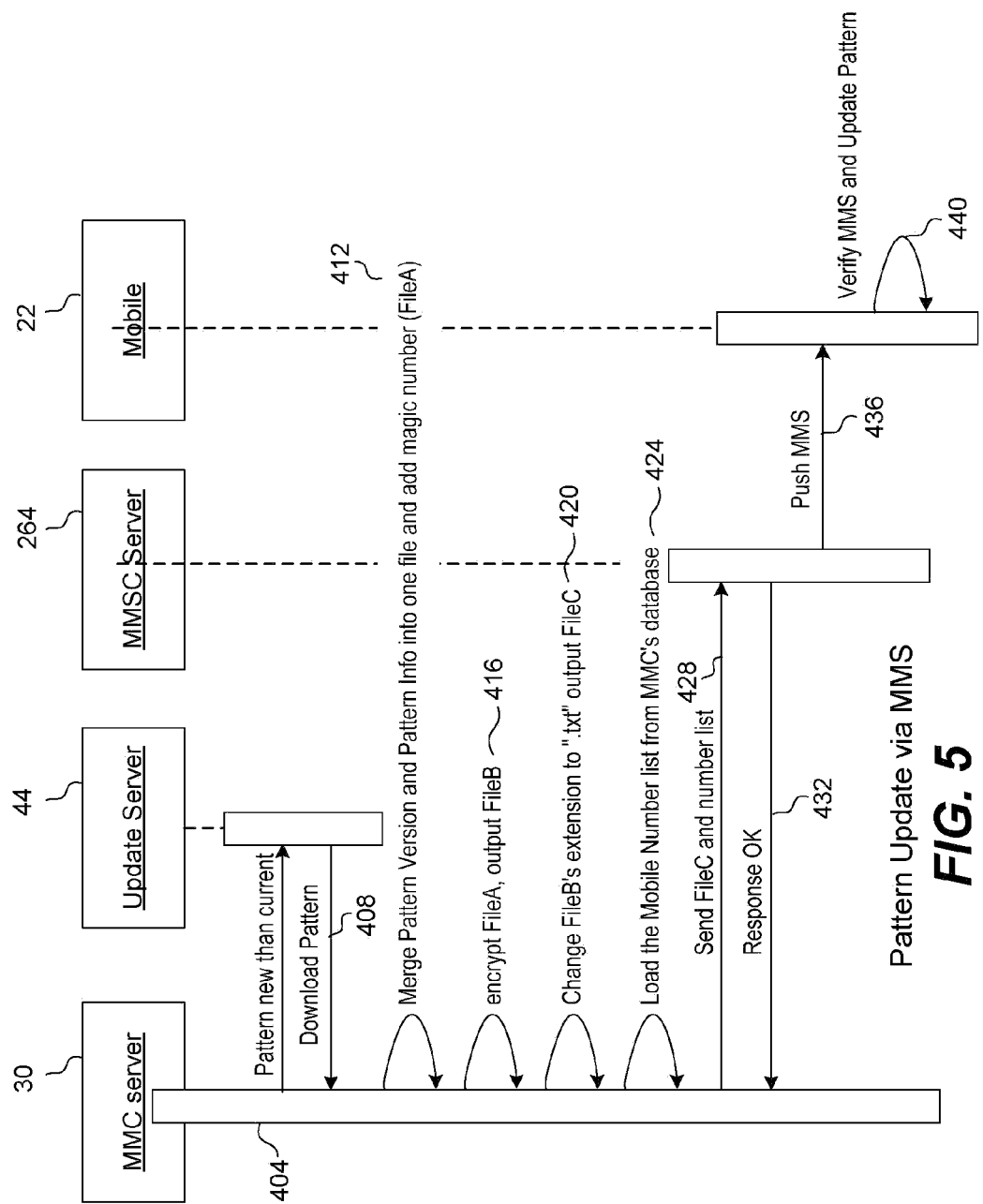
FIG. 5 illustrates one embodiment by which the MMS message is sent and the pattern file attached.

FIG. 5 illustrates one embodiment by which the MMS message is sent and the pattern file attached. At 404 the MMC checks whether the anti-virus software update source server has the latest pattern available for a particular mobile antivirus software product. At 408, if a new pattern is available then the MMC downloads the new pattern. In a situation where the new pattern includes many files, at 412 the MMC merges these files into one file and adds a magic number; we refer to this file as "File A." If the new pattern is contained within a single file then this file is referred to as "File A" and a magic number is also added to the file. The magic number is a particular number or sequence of characters known to a software module on the mobile device that identifies an attached file as a virus pattern file. Alternatively, any suitable cryptographic technique such as use of a digital signature may also be used to sign an attached file identifying it as a virus pattern file.

At 416 the MMC encrypts "File A" and outputs the encrypted file, "File B." At 420 the MMC adds the extension ".txt" to "File B," thus producing "File C." At 424 the MMC loads the mobile telephone number list of its supported mobile devices from its database. This list is a list of all the numbers of mobile devices that have arranged with MMC to periodically update pattern files on the device. At 428 the MMC sends "File C" and the mobile number list to MMSC server 264. At 432 the MMSC responds that it has received the file and the number list; the MMSC server accepts "File C" and prepares an MMS transmission using "File C."

At 436 the MMSC sends this MMS transmission including File C to each of the telephone numbers in the list representing the mobile devices needing a pattern update. At 440 the mobile device verifies the received MMS message and extracts the pattern file from the MMS message. If the extraction is a success, the mobile device uses the pattern file to update its particular virus pattern.

Updating Pattern File on Mobile Device

As mentioned above, a new pattern file may be delivered to any suitable handheld, mobile device using MMS according to embodiments of this invention. In particular embodiments, the mobile wireless device is a mobile telephone. Specifically, the mobile telephone may be running an operating system such as the Symbian operating system or the Windows Mobile operating system for. The below description describes how the pattern file is retrieved from the MMS message and incorporated into the antivirus software on the user's mobile telephone using each of these operating systems, although the present invention is also applicable to other operating systems and other mobile devices.

Figure 6:
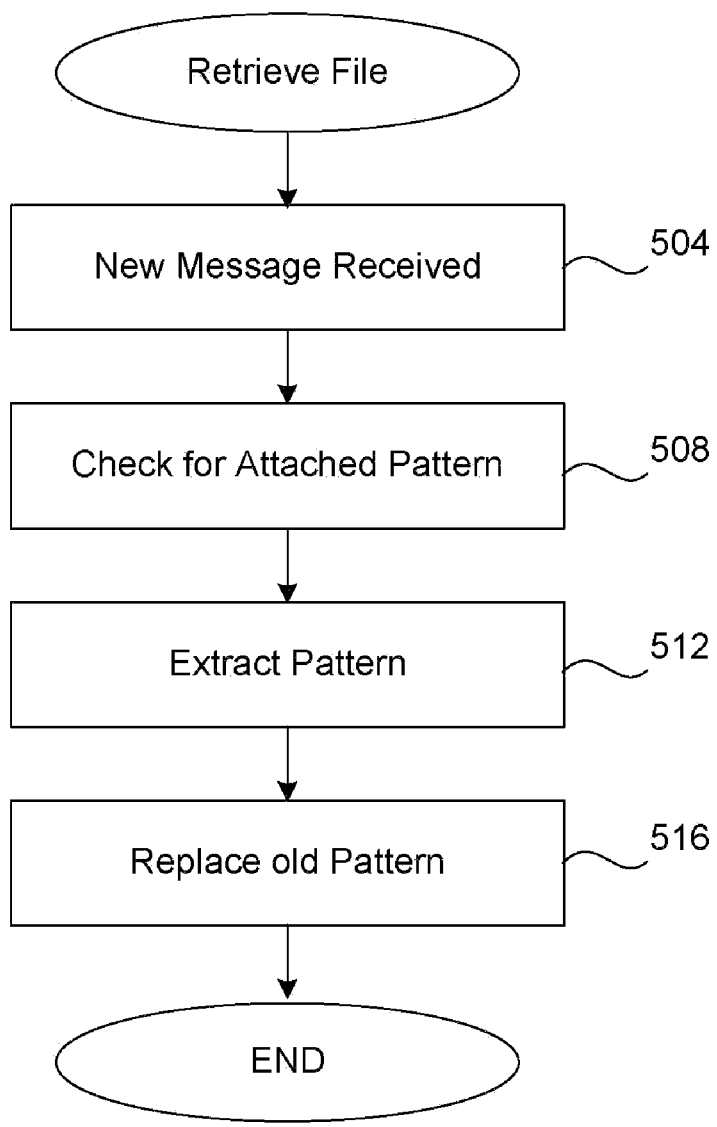
FIG. 6 is a flow diagram describing how the pattern file is retrieved from the MMS message under various operating systems.

FIG. 6 is a flow diagram describing how the pattern file is retrieved from the MMS message under various operating systems. At 504 a new MMS message is indicated as being received on the user's wireless mobile device. In one embodiment, the MMSC sends a notification to the mobile device via push technology (in a GPRS network, it is a WAP push message). The mobile device receives this push message, then downloads the message from MMSC. Under some operating systems, such as Symbian, the operating system sends an event to all processes when the message is received. Thus, any processes waiting for an MMS message will be able to detect this event. If a particular operating system does not send an event upon receipt of the message, then a software hook technique is used to detect the event. Generally, a software hook technique is known in the art. For example, a software hook is used in a system API to detect a received event. When a particular system call is made, the software hook also sends an indication to a software module that is waiting for the MMS message to arrive. In another embodiment, the software module periodically checks the MMS inbox of the mobile device to detect whether a new message has arrived.

At 508 the mobile device checks whether a pattern file is attached to the MMS message. In one embodiment, it is determined whether the attached file is a valid virus pattern file by first decrypting the attached file and then checking the previously included magic number. If the magic number matches the number expected by the software module on the mobile device, then it is determined that the attached file is a valid pattern file.

At 512 the pattern file is extracted from the MMS message and is used to overwrite the existing pattern file in the antivirus software on the mobile device. In one embodiment, the operating system of the mobile device provides an API to extract the attached pattern file from the MMS message. The antivirus software on the mobile device can also follow the WAP-206 or WAP-209 protocols to extract the pattern file. Once the pattern file has been extracted from the message, the antivirus software uses the new pattern file to replace the current pattern file at 516.

In one embodiment, extraction of the pattern file from the MMS message occurs under the Microsoft Mobile operating system. In this embodiment, the antivirus software periodically checks the MMS inbox or uses an API hook to check whether a new MMS message has arrived. Next, the software extracts the attachment of the MMS message and checks whether it is a virus pattern using the magic number. If so, the pattern file or pattern files are extracted from the attached file. Next, the old pattern file or files are replaced by the new file or files.

Further Embodiments

In one specific embodiment of the invention, the invention is integrated with the product Trend Micro Mobile Security (TMMS) version 2.0 available from Trend Micro, Inc. of Cupertino, Calif. TMSS helps protect data-centric mobile devices (such as smart phones and wireless handheld devices) from computer viruses and SMS spam. The product TMMS is compatible with the Microsoft Mobile operating systems and with the Symbian versions 7 and 8 operating systems. The pattern files used with Mobile Security are small enough to be sent via MMS and are on the order of about 40 kB. Mobile Security is able to perform automatic, real-time scanning and detection of viruses and other malware on wireless mobile devices and their storage cards. Mobile users may also initiate manual scans.

Mobile Security can also receive updated pattern files via general packet radio service (GPRS) or by synchronizing with antivirus pattern file updates on a local PC. Mobile Security takes advantage of TrendLabs, a global antivirus research and support team of engineers from Trend Micro who monitor virus activity, develop information on new threats, and deliver security products to customers.

The present invention may also be used in the context of all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not exact in that many groups overlap. For example, commercially available so-called "anti-virus" software is designed to scan a computer for viruses and worms, as well as for other malicious software. Of course, later developed software not currently known may also fall within the definition of malware. As used herein, the term malware is used to describe both the examples of malware and grayware described below.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another.

Computer worms are similar to viruses but are stand-alone software and thus do not require host files or other types of host code to spread themselves; they can move over the Internet using e-mail or socket connections. They do modify the host operating system, however, at least to the extent that they are started as part of the boot process. In order to execute, worms either exploit some vulnerability of the target host or use some kind of social engineering to trick users into executing them. Once executed, a computer worm might drop a backdoor program or a computer virus. Computer viruses and worms have common characteristics and that they both can propagate, they are covert and their effects can be devastating. Other differences are that a virus will attack the affected program while it is running, while a worm can attack other programs; viruses typically attack local files while worms typically attack remote network computers.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. Software known as URL injection software modifies a browser's behavior with respect to some or all domains. It modifies the URL submitted to the server to profit from a given scheme by the content provider of the given domain. This activity is often transparent to the user.

A robot network or botnet is a large number of compromised computers that are used to create denial of service attacks or to send spam autonomously (also termed a zombie army). A target computer is often compromised via a Trojan horse that opens an IRC channel and waits for remote commands from the person in control of the botnet. The software of the botnet (botware) may be run as an independent process, but it tends to run inside other normal processes.

Other techniques used by malware include the following. A remote buffer overflow attack takes advantage of a security flaw in a computer and can be used by a worm, botnet, or by a hacker's remote control. Remote thread injection is a software development technique used to inject code into another process to run it as a thread. A hacker can use this same technology to propagate others processes without any file operations in order to disguise malware.

Another category of undesirable software is grayware. Grayware includes applications that cause annoying and possibly undesirable or unforeseen behavior in the way the programs run. Grayware is not necessarily detrimental to basic system operations, but it harbors the risk of opening computer vulnerabilities. Some applications classified as grayware are misused for malicious activity while others together and transmit information about a computer user's behavior. Grayware includes spyware, adware, dialers, hacking tools, joke programs and remote access tools.

Spyware is a piece of software that collects and sends information (such as browsing patterns or credit card numbers) about users and the results of their computer activity without explicit notification. Spyware usually works and spreads like Trojan horses. Adware is software that displays banner advertisements or pop-up advertisements when a computer is in use. Adware can have undesired effects on the system, such as interrupting an Internet connection or system operations, and is generally regarded as irritating and intrusive by users. A dialer is a program that replaces the telephone number in a modem's dial-up connection with a long-distance number (often out of the country) in order to run up telephone charges on pay-per-dial numbers, or dials out at night to send key logger or other information to a hacker.

Hacking tools render a computer or network more vulnerable to attack or use simulated hacking to test the vulnerability of accessible components. Hacking tools can be used to spy on an entire network and make it easy to exploit vulnerabilities. Although used to test the security of networks, they can be misused. Joke programs are relatively harmless although they can be annoying, such as by simulating a virus attack. Remote access tools enable remote access to an infected computer, thus permitting outside administration or manipulation. These tools are legitimate tools for managing external computers although they can be used to exploit vulnerabilities and can be misused. Mobile messaging malware (MMM) is malware propagated via a mobile messaging system including MMS, SMS or WAP push messages.

Computer System Embodiment

Figure 7A:
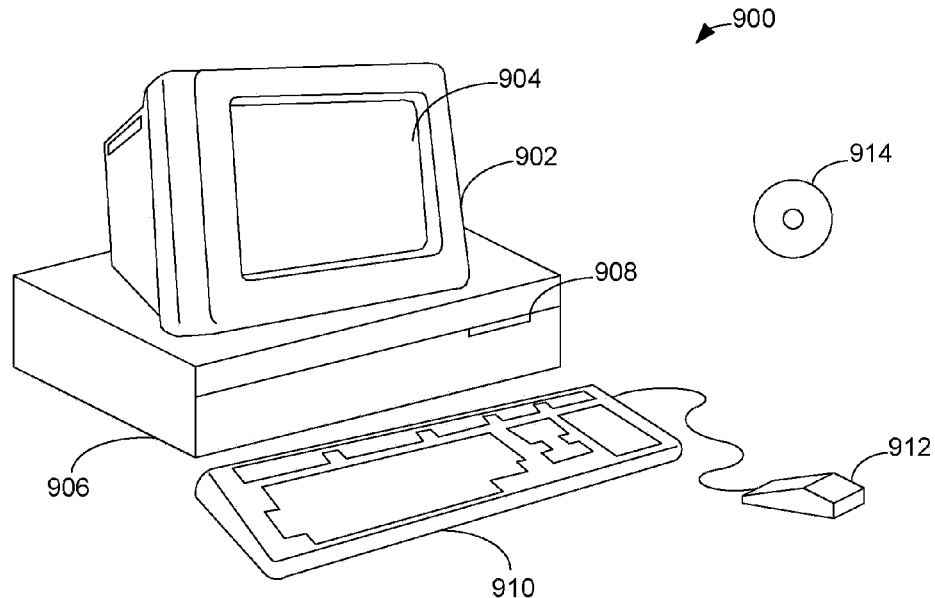
FIGS. 7A and 7B illustrate a computer system suitable for implementing embodiments of the present invention.
Figure 7B:
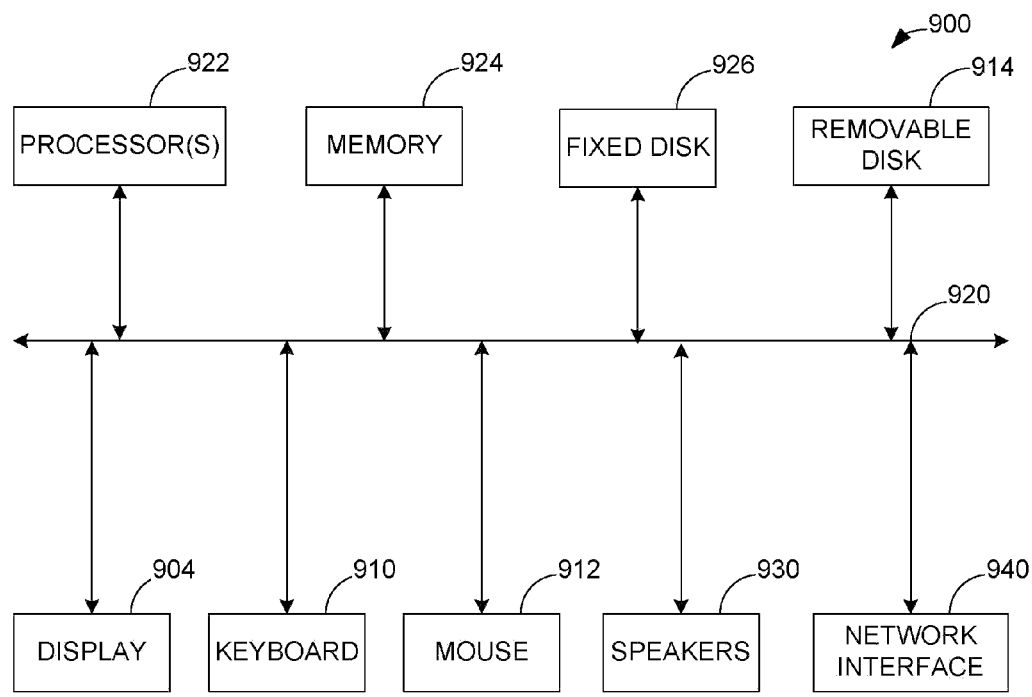

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of updating a virus pattern in a handheld, wireless device, said method comprising:

receiving a new virus pattern that is arranged to aid in the detection of malware on said wireless device;

sending said new virus pattern and a telephone number of said wireless device to a Multimedia Message Service Center (MMSC);

relaying said new virus pattern from said MMSC to said wireless device, said new virus pattern being attached to an MMS message as an attachment;

adding a unique identifier to said MMS message at said MMSC;

receiving said MMS message and said new virus pattern at said wireless device;

verifying said unique identifier at said wireless device, whereby said wireless device determines that said MMS message incorporates said new virus pattern;

extracting said attachment from said MMS message at said wireless device to obtain said new virus pattern; and replacing an old virus pattern of said wireless device with said new virus pattern, whereby antivirus software on said wireless device is updated.

2. A method as recited in claim 1 wherein said wireless device is a smart telephone, a mobile telephone, a personal digital assistant, a Blackberry or an electronic personal organizer.

3. A method as recited in claim 1 further comprising:
encrypting said new virus pattern before said new virus pattern is sent to said MMSC; and
decrypting said encrypted new virus pattern at said wireless device.

4. A method as recited in claim 1 further comprising:
merging a version number of said new virus pattern, said new virus pattern and a magic number into a single file;
sending said single file to said MMSC for relaying to said wireless device as part of said MMS message; and
extracting said version number, said new virus pattern and said magic number from said single file at said wireless device.

5. A method as recited in claim 1 further comprising:
determining a list of mobile telephone numbers, each of said mobile telephone numbers representing a handheld, wireless device;
sending said new virus pattern and said list of mobile telephone numbers to said Multimedia Message Service Center (MMSC); and
relaying said new virus pattern from said MMSC to said wireless devices using said list of mobile telephone numbers, said new virus pattern being integrated with a single MMS message destined for each of said wireless devices.

6. A method as recited in claim 1 wherein said new virus pattern is an entire virus pattern, whereby a differential pattern need not be created.

7. A method as recited in claim 1 wherein said new virus pattern has a size of at least about 40 kB.

8. A method of updating a virus pattern in a handheld, wireless device, said method comprising:
installing an old virus pattern in said wireless device, said old virus pattern arranged to aid in the detection of malware on said wireless device;
receiving an MMS message over a wireless network;
determining a unique identifier of said MMS message;
verifying that said unique identifier indicates that said MMS message includes a new virus pattern, said new virus pattern included as an attachment;
extracting said attachment from said MMS message to obtain said new virus pattern; and
replacing said old virus pattern with said new virus pattern.

9. A method as recited in claim 8 wherein said wireless device is a smart telephone, a mobile telephone, a personal digital assistant, a Blackberry or an electronic personal organizer.

10. A method as recited in claim 8 further comprising:
decrypting said new virus pattern at said wireless device.

11. A method as recited in claim 8 further comprising:
extracting a version number and a magic number from said MMS message that incorporates said new virus pattern; and
verifying that said magic number indicates that said MMS message incorporates said new virus pattern.

12. A method as recited in claim 8 wherein said new virus pattern is an entire virus pattern, whereby a differential pattern need not be created.

13. A method as recited in claim 8 wherein said new virus pattern has a size of at least about 40 kB.

14. A system for updating a virus pattern in handheld, wireless devices, said system comprising:
an update server that includes a new virus pattern, said new virus pattern arranged to aid in the detection of malware on said wireless devices;
a mobile management center (MMC) that includes a list of mobile telephone numbers, each of said mobile telephone numbers identifying one of said wireless devices, said MMC being arranged to receive said new virus pattern from said update server, wherein said MMC is further arranged to add a unique identifier to said new virus pattern before said new virus pattern is sent to said MMSC;
a Multimedia Message Service Center arranged to send MMS messages to said wireless devices, said MMSC being further arranged to receive said new virus pattern and said list of mobile telephone numbers from said MMC, and wherein said MMSC is further arranged to attach said new virus pattern to each of said MMS messages as an attachment; and
at least one of said wireless devices, said wireless device including an old virus pattern and being arranged to receive one of said MMS messages from said MMSC that incorporates said new virus pattern, said at least one wireless device being further arranged to extract said new virus pattern from said one MMS message and to verify said unique identifier of said new virus pattern, and being further arranged to replace said old virus pattern with said new virus pattern.

15. A system as recited in claim 14 wherein at least one of said wireless devices is a smart telephone, a mobile telephone, a personal digital assistant, a Blackberry or an electronic personal organizer.

16. A system as recited in claim 14 wherein said MMC is further arranged to encrypt said new virus pattern before said new virus pattern is sent to said MMSC, and wherein said wireless device being further arranged to decrypt said encrypted new virus pattern.

17. A system as recited in claim 14 wherein said MMC is further arranged to merge a version number of said new virus pattern, said new virus pattern and a magic number into a single file, and to send said single file to said MMSC for relaying to said wireless devices.

18. A system as recited in claim 14 wherein said new virus pattern is an entire virus pattern, whereby a differential pattern need not be created.

19. A method as recited in claim 14 wherein said new virus pattern has a size of at least about 40 kB.

\* \* \* \* \*

UNITED STATES PATENT AND TRADEMARK OFFICE
CERTIFICATE OF CORRECTION

| | |
|---|---|
| PATENT NO. | : 7,634,262 B1 |
| APPLICATION NO. | : 11/369704 |
| DATED | : December 15, 2009 |
| INVENTOR(S) | : Zhonglei Li |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Ninth Day of November, 2010

David J. Kappos
*Director of the United States Patent and Trademark Office*